(12) United States Patent
Buuck et al.

(10) Patent No.: US 9,703,406 B2
(45) Date of Patent: Jul. 11, 2017

(54) REDUCTION OF TOUCH-SENSOR INTERFERENCE FROM ACTIVE DISPLAY

(71) Applicant: Amazon Technologies, Inc., Seattle, WA (US)

(72) Inventors: David C. Buuck, Prunedale, CA (US); John Mathew Depew, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 14/569,037

(22) Filed: Dec. 12, 2014

(65) Prior Publication Data

US 2015/0097799 A1   Apr. 9, 2015

Related U.S. Application Data

(62) Division of application No. 12/851,029, filed on Aug. 5, 2010, now Pat. No. 8,917,249.

(51) Int. Cl.
*G06F 3/041* (2006.01)

(52) U.S. Cl.
CPC ............ *G06F 3/041* (2013.01); *G06F 3/0418* (2013.01)

(58) Field of Classification Search
CPC .............................. G06F 3/041; G06F 3/0418
See application file for complete search history.

(56) References Cited

U.S. PATENT DOCUMENTS

| 6,998,545 | B2 | 2/2006 | Harkcom et al. |
| 2004/0227735 | A1* | 11/2004 | Pratt ............... G06F 3/0416 345/173 |
| 2007/0085837 | A1 | 4/2007 | Ricks et al. |
| 2008/0158169 | A1* | 7/2008 | O'Connor ............ G06F 3/0418 345/173 |
| 2009/0256868 | A1 | 10/2009 | Low et al. |
| 2010/0013761 | A1 | 1/2010 | Birnbaum et al. |
| 2010/0149127 | A1 | 6/2010 | Fisher et al. |
| 2011/0115729 | A1 | 5/2011 | Kremin et al. |

OTHER PUBLICATIONS

Final Office Action for U.S. Appl. No. 12/851,088, mailed on Jun. 1, 2015, David C. Buuck, "Reduction of Touch-Sensor Interference from Stable Display", 13 pages.
Office action for U.S. Appl. No. 12/851,088, mailed on Sep. 10, 2015, Buuck et al., "Reduction of Touch-Sensor Interference from Stable Display", 12 pages.
Office action for U.S. Appl. No. 12/851,029, mailed on Feb. 4, 2013, Buuck et al., "Reduction of Touch-Sensor Interference from Active Display", # pages.

(Continued)

*Primary Examiner* — Ariel Balaoing
(74) *Attorney, Agent, or Firm* — Lee & Hayes, PLLC (57) ABSTRACT

An interference suppression module coordinates devices susceptible to interference such as a touch sensor with potentially interference generating devices such as a display drive matrix, an active haptic device, and so forth. As a result of status signals generated by the interference suppression module, controllers of the susceptible devices may modify the input received to mitigate or avoid interference.

20 Claims, 10 Drawing Sheets

(56) References Cited

OTHER PUBLICATIONS

Office action for U.S. Appl. No. 12/851,088, mailed on Jan. 30, 2013, Buuck et al., "Reduction of Touch-Sensor Interference from Stable Display", 14 pages.
Office Action for U.S. Appl. No. 12/851,088, mailed on Nov. 20, 2014, David C. Buuck, "Reduction of Touch-Sensor Interference from Stable Display", 12 pages.
Office action for U.S. Appl. No. 12/851,088, mailed on May 15, 2013, Buuck et al., "Reduction of Touch-Sensor Interference from Stable Display", 18 pages.
Office action for U.S. Appl. No. 12/851,029, mailed on Aug. 7, 2013, Buuck et al, "Reduction of Touch-Sensor Interference from Active Display", 12 pages.

\* cited by examiner

REDUCTION OF TOUCH-SENSOR INTERFERENCE FROM ACTIVE DISPLAY

RELATED APPLICATIONS

This application claims priority to and is a Division of U.S. patent application Ser. No. 12/851,029, filed on Aug. 5, 2010, the entire contents of which are incorporated herein by reference.

BACKGROUND

Touch sensors are used by electronic devices to accept input from users. These touch sensors may utilize a variety of techniques to determine a touch by a user or an object. Often, these techniques involve the sampling of electrical characteristics such as resistance, capacitance, inductance, and so forth. As a result, touch sensors are subject to interference due to electromagnetic fields from adjacent devices, such as a display drive matrix in a display. Other touch sensor technologies, such as those which utilize acoustic or optical technologies may also suffer interference from adjacent devices. Additionally, physical dislocations due to haptic output may also induce interference in the touch sensor. These and other sources of interference may result in spurious signals which a touch sensor controller may erroneously interpret as a touch input.

Traditionally, this interference has been addressed by oversampling, noise filtering, and so forth. However, these approaches increase complexity and cost of devices, increase power draw, and may reduce the fidelity of the touch input.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Electronic devices such as cellular phones, portable media players, tablet computers, netbooks, laptops, personal computers, cash registers, electronic book ("eBook") readers, and so forth, increasingly incorporate touch sensors as input devices to enable users to control and otherwise interact with the devices as well as displays to present information to the users. Traditionally a variety of brute force methods such as oversampling and filtering are used to ameliorate interference resulting from adjacent devices such as a display's drive matrix, a haptic output device, and so forth. Such approaches increase the complexity of the electronic device, and may result in greater parts count, cost, and so forth. Furthermore, the traditional methods may result in less accurate touch inputs, as intentional touches are incorrectly removed as erroneous inputs.

Described herein are methods and systems for reducing interference between components within an electronic device. The activities of components that generate, or potentially generate, interference are coordinated with the function of one or more components potentially susceptible to the interference. This coordination is accomplished by coupling the potentially interference generating components with the potentially susceptible devices. Potentially interference generating sources include a display and associated display drive matrix, a haptic output device, external power supply, and so forth.

Active displays include liquid crystal displays, light emitting diodes, digital light modulators, cathode ray tubes, plasma displays, and so forth. To maintain an image, active displays refresh periodically, and require constant application of power. Upon cessation of power, display of the image stops. The display may incorporate a display drive matrix or other drive electronics which generate pixels on the display. During operation of the active display, particularly during refresh, electrical current flows resulting in electromagnetic (EM) fields.

Components potentially susceptible to this type of interference include touch sensors, keypads, radio frequency receivers, and so forth. For example, capacitive and projected capacitance touch sensor components may experience undesired EM coupling to the display drive matrix while the display drive matrix is in operation. Other types of touch sensors which rely on other technologies including, but not limited to, optical or acoustic detection of touches may also experience similar issues.

This undesired EM coupling interferes with the operation of the touch sensor by generating noise in an output of the touch sensor. This touch sensor output is used as an input signal at the touch sensor controller. The touch sensor controller may then incorrectly interpret the noise as a touch input, or may be unable to recover the touch signal from within the noise.

As mentioned above, traditionally, this interference was addressed by oversampling, noise filtering, and so forth. However, these approaches increase complexity and cost of devices, increase power consumption, and may reduce the fidelity of the touch input as intentional touch signals are filtered out.

In one implementation described herein, a touch sensor controller susceptible to interference is coordinated with an interference-generating display drive matrix via an interference suppression module. When the display controller triggers the display drive matrix to update the display, thereby also generating the EM interference, the interference suppression module is aware of the update and signals the touch sensor controller to modify input from the touch sensor during the update.

By modifying this input, the touch sensor controller is able to avoid treating erroneous input from the touch sensor as reliable. As a result, more accurate touch input is obtained. Modifying the input may include tagging input with various states. For ease of reference, some of these states include "reliable," "suspect," and "unreliable." These states relate an actual or anticipated noise level associated with operation of interference generating components. For example, when no interference generating devices are active, the touch sensor controller tags the input as reliable (or potentially not tagged at all). When some interference is experienced, the touch sensor controller tags the input as suspect and may perform additional filtering or weighting to attempt to recover useful input. When a significant level of interference is experienced, the touch sensor controller tags the input as unreliable and may discard the input. The touch sensor controller thus handles the input according to the nature of the tag. For instance, the controller may refrain from modifying reliable input, may filter or weight suspect input, and may discard unreliable input.

The awareness between the interference generating components and those components susceptible to interference via the interference suppression module improves overall performance. For example, by accepting user input via the touch sensor while the display drive matrix is inactive, such as between refreshes of the display, noise received by the touch sensor is reduced. This results in an improved signal to noise ratio, which permits the touch sensor controller to tag input during this quiet interval as reliable. As a result, oversampling and filtering become unnecessary, which also simplifies overall design and operation of the device.

Touch sensors may also receive noise from active haptic devices. An active haptic device in operation may generate physical movement, displacement, or other physical manifestation of at least a portion of the device in which the active haptic device resides. A pressure sensitive touch sensor coupled to the active haptic device might inadvertently generate a touch signal when in fact the pressure results from the active haptic device.

The active haptic device may utilize electrical components, such as motors, piezoelectric actuators, memory metals, and so forth. During operation, these electrical components or components associated with supporting components such as a power supply may emit EM fields. As described above, these EM fields may couple inadvertently with interference-susceptible components such as the touch sensor. As a result, in addition to erroneous signals from the physical displacement of the active haptic device, the touch sensor may experience erroneous signals from unwanted EM coupling with the active haptic device.

To address the potential interference from the active haptic device, in another implementation described herein, a haptic controller coupled to the haptic output device is coordinated with the touch sensor controller via the interference suppression module. When the haptic output device is active and potentially generating mechanical or EM noise in the touch sensor, the touch sensor controller modifies input from the touch sensor. Modification may include an adaptive threshold which accounts for characteristics of the overall device. Knowing the characteristics of the overall device and the haptic output allows cancellation or mitigation of interference from the active haptic device. Similarly, because haptic events may be confined to a particular area, tagging of input may also be specific to the region being updated.

The coordination between the potentially susceptible components and those which potentially generate interference may allow for modification before the interfering event or after. In one implementation, a priori knowledge of operation by an interfering component via an output status signal indicating impending operation, received by the interference suppression module, allows for subsequent modification of data from the susceptible component. In another implementation, a posteriori knowledge of the activities by the interfering component may be used to modify data previously collected from the susceptible component, such as input within an input buffer. In yet another implementation, both the advance output status signal and the modification of previously collected data may be combined.

Illustrative Touch-Screen Device

Figure 1:
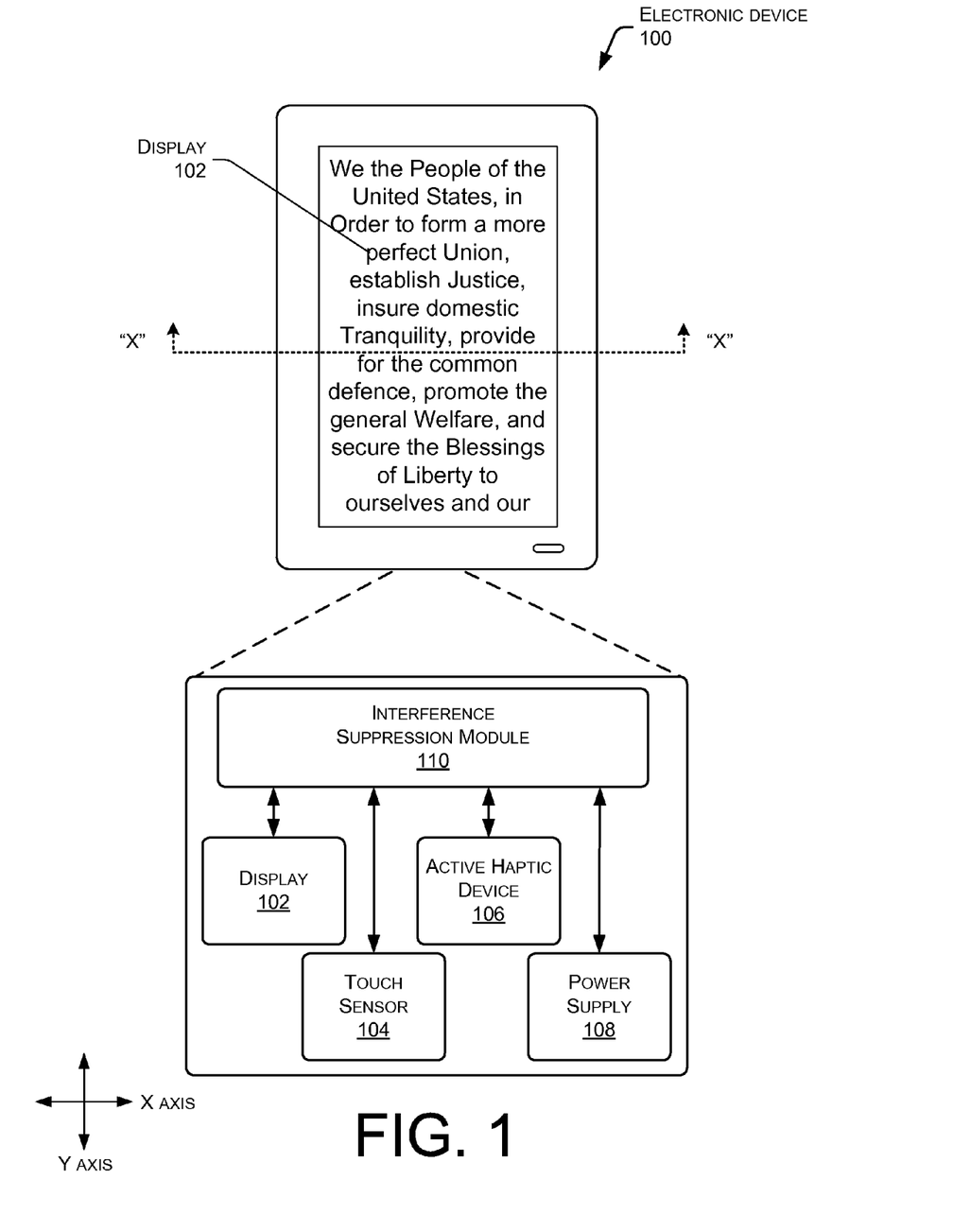
FIG. 1 depicts an illustrative electronic device (here, an electronic book reader device) having a display, a touch sensor, an active haptic device, and an interference suppression module.

FIG. 1 depicts an illustrative electronic device 100 having a display, a touch sensor, an active haptic device, and an interference suppression module. The electronic devices 100 include electronic book readers, cellular phones, portable media players, cash registers, personal computers, tablet computers, netbooks, laptops, desktops, kiosks, and so forth.

FIG. 1 depicts that electronic device 100 includes an active display 102, described in more depth below with regards to FIG. 2, configured to present information to a user. Approximately perpendicular to the long axis of the display is cross sectional line "X," with cross sections discussed below with regards to FIGS. 3-4.

As illustrated, the electronic device 100 includes a touch sensor 104 for receiving user input. The touch sensor 104 may comprise a capacitive touch array, a projected capacitance touch array, a resistive touch array, an interpolating force sensitive resistor array, an optical touch sensor, an acoustic touch sensor, and so forth. This touch sensor 104 may be adjacent to or integrated with the display 102 to form a touch screen. In some implementations, an active haptic device 106 may provide physical stimulus to the user. This physical stimulus may include simulating the tactile experience of pushing a button and so forth. A power supply 108 provides electrical power to the device for operation, charging, and so forth.

An interference suppression module 110 couples to one or more interference generating components and one or more components susceptible to interference. As shown here, the interference suppression module 110 couples to the display 102, the touch sensor 104, the active haptic device 106, and the power supply 108. Briefly, the interference suppression module 110 coordinates a potentially interfering event such as a refresh of the display 102, or a haptic output from the active haptic device 106, and so forth with operation of a susceptible component such as a touch sensor 104.

The touch sensor controller accepts or modifies output from the touch sensor 104 which may contain noise resulting from the interfering EM field. Power consumption may be decreased by deactivating power consuming scans of the touch sensor 104 during periods of interference. The interference suppression module 110 is discussed in more depth below with regards to FIG. 2.

Figure 2:
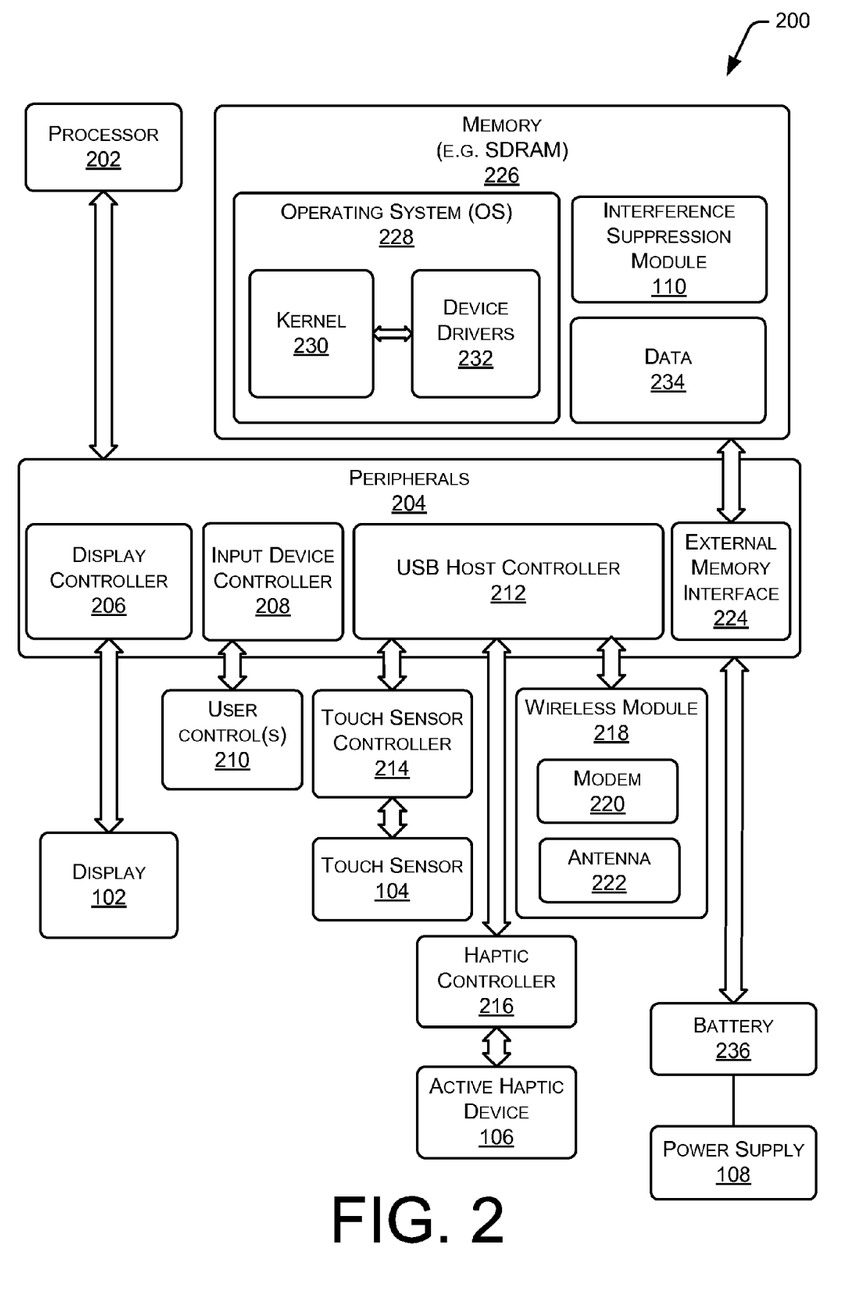
FIG. 2 is a block diagram of an illustrative electronic device showing internal components of the electronic book reader device of FIG. 1

FIG. 2 is a block diagram 200 of the illustrative electronic device 100 showing the internal components. In a very basic configuration, the device 100 includes or accesses components such as a processor 202 and one or more peripherals 204. Each processor 202 may itself comprise one or more processors.

Peripherals 204 couple to the processor 202. A display controller 206 is shown coupled to one or more displays 102. These displays may comprise drive electronics, such as a display drive matrix configured to affect individual pixels within the display 102. In some implementations, multiple displays may be present and coupled to the display controller 206. These multiple displays may be located in the same or different enclosures or panels. Furthermore, one or more display controllers 206 may couple to the multiple displays.

The display 102 may present content in a human-readable format to a user. The display 102 generates an image while power is applied and is periodically refreshed at regular time intervals.

When multiple displays are present, these displays may be of the same or different types. For example, one display may be a liquid crystal display while another is a digital light modulator.

In some implementations, the content presented on the display 102 may take the form of electronic books or "eBooks." For example, the display 102 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 100 further includes a touch sensitive input device. In one implementation, the touch sensor 104 may be placed behind the display, such that user input through contact or gesturing relative to the display 102 may be received. In another implementation, the touch sensor may be placed in front of the display 102, or in another part of the device altogether. For convenience only, the display 102 is shown in a generally rectangular configuration. However, it is understood that the display 102 may be implemented in any shape, and may have any ratio of height to width. Also, for stylistic or design purposes, the display 102 may be curved or otherwise non-linearly shaped. Furthermore the display 102 may be flexible and configured to fold or roll.

The electronic device 100 may have an input device controller 208 configured to accept input from the touch sensor, keypad, keyboard, or other user actuable controls 210. These user actuable controls 210 may have dedicated or assigned operations. For instance, the actuatable controls 112 may include page turning buttons, a joystick, navigational keys, a power on/off button, selection keys, joystick, touchpad, and so on.

The peripherals 204 may include a USB host controller 212. The USB host controller 212 manages communications between components attached to a universal serial bus ("USB") and the processor 202 and other peripherals.

FIG. 2 further illustrates that the electronic device 100 includes a touch sensor controller 214. The touch sensor controller 214 may couple to the processor 202 via the USB host controller 212 (as shown). In other implementations the touch sensor controller 214 may couple to the processor via the input device control 208, inter-integrated circuit ("I²C"), universal asynchronous receiver/transmitter ("UART"), serial peripheral interface bus ("SPI"), or other interface. The touch sensor controller 214 is also coupled to the touch sensor 104.

The touch sensor controller 214 is configured to use the touch sensor 104 to determine characteristics of interaction with the touch sensor. These characteristics may include the location of the touch on the touch sensor 104, magnitude of the force, shape of the touch, and so forth.

A haptic controller 216 may couple to the USB host controller 212. In another implementation, the haptic controller 216 may couple to another interface within the electronic device 100. The haptic controller 216 couples to the active haptic device 106. As described above, the active haptic device 106 provides a physical sensation to the user.

The USB host controller 212 may also couple to a wireless module 218 via the universal serial bus. The wireless module 218 may allow for connection to wireless local or wireless wide area networks ("WWAN"). The wireless module 218 may include a modem 220 configured to send and receive data wirelessly and one or more antennas 222 suitable for propagating a wireless signal. In other implementations, a wired network interface may be provided.

The electronic device 100 may also include an external memory interface ("EMI") 224 coupled to external memory 226. The EMI 224 manages access to data stored in the external memory 226. The external memory 226 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 226 may store an operating system 228 comprising a kernel 230 operatively coupled to one or more device drivers 232. The device drivers 232 are also operatively coupled to the peripherals 204. The external memory 226 may also store data 234, which may comprise content objects for consumption on the electronic device 100, executable programs, databases, user settings, configuration files, device status, and so forth.

As shown, the external memory 226 may store a portion of the interference suppression module 110. In another implementation, the interference suppression module 110 may comprise components and signal lines present outside of the external memory 226.

The electronic device 100 may include one or more other, non-illustrated peripherals, such as a hard drive using magnetic, optical, or solid state storage to store information, a firewire bus, a Bluetooth™ wireless network interface, camera, global positioning system, PC Card component, and so forth.

One or more batteries 236 may provide operational electrical power to components of the electronic device 100 for operation when the device is disconnected from a power supply 108. Operational electrical power is sufficient to provide for operation of the device, as distinguished from the lesser electrical power requirements of a sleep or state retention mode. Power supply 108 may be internal or external to the electronic device 100. Power supply 108 is configured to provide operational power for electronic device 100, charge battery 236, or both. "Battery" as used in this application includes components capable of acting as a power source to an electronic device. Power sources include chemical storage cells such as lithium polymer batteries, charge storage devices such as ultracapacitors, fuel cells, and so forth.

Couplings, such as that between touch sensor controller 214 and the USB host controller 212, are shown for emphasis. There are couplings between many of the components illustrated in FIG. 2, but graphical arrows are omitted for clarity of illustration.

Figure 3:
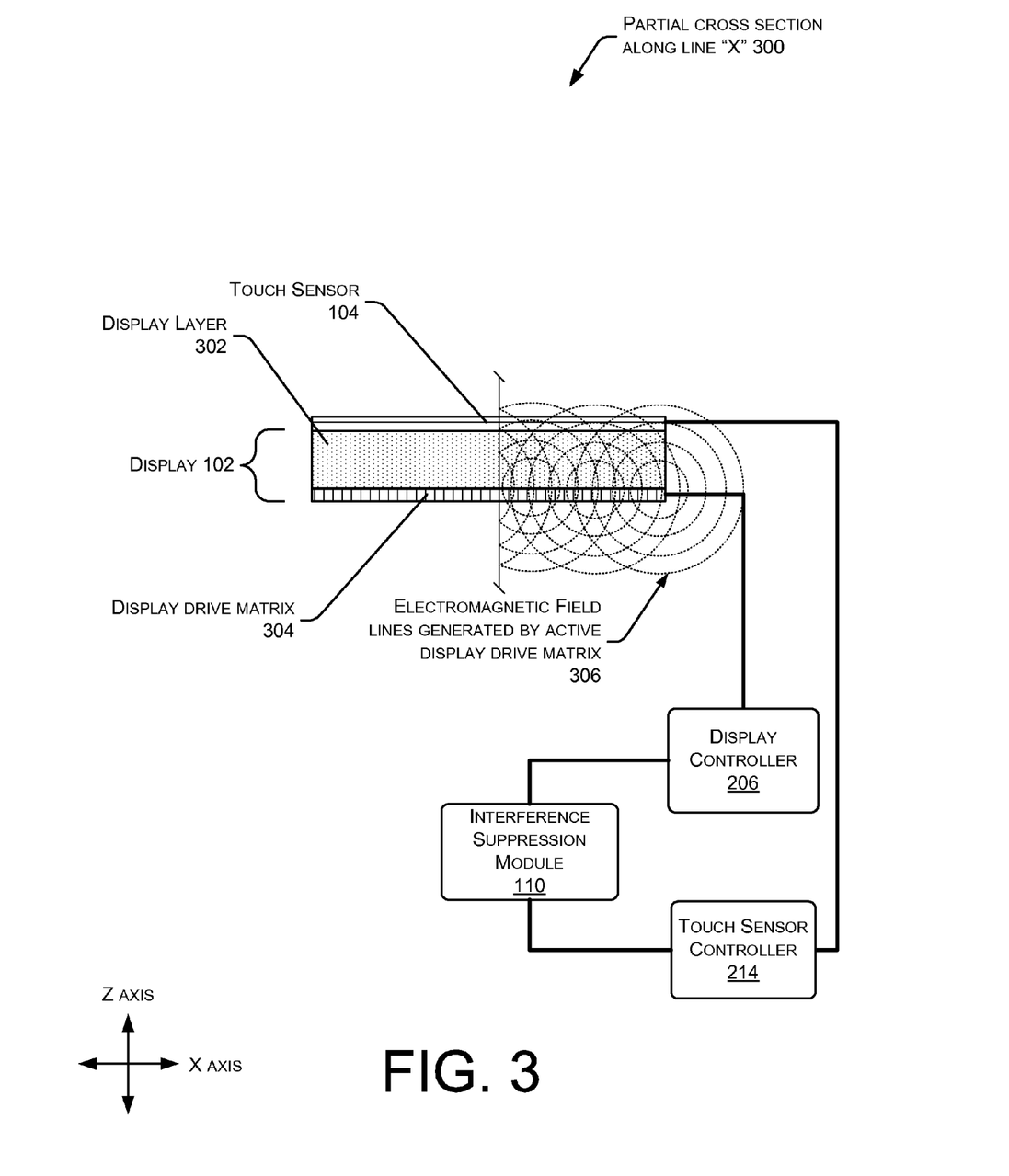
FIG. 3 illustrates a cross section of the device depicting the display, the touch sensor, and interference from the display drive matrix.

FIG. 3 illustrates an enlarged cross section 300 of the device 100 along line "X" depicting the layers of one implementation of the display 102 and the touch sensor 104 and interference from the display drive matrix. In this illustration, the touch sensor 104 is presented on the upper surface, proximate to a user during normal use. For example, a capacitive or projective capacitance touch sensor may be disposed as shown. Other layers such as a protective sheet may be disposed between the touch sensor and the user, but are omitted in this illustration for clarity. The touch sensor 104 is also shown coupled to the touch sensor controller 214 which accepts output from the touch sensor 104.

A display layer 302 and display drive matrix 304 comprise the display 102. In a display 102 such as liquid crystal display, the display drive matrix 304 may comprise a thin-film-transistor (TFT) array which, when active, alters the orientation or position of liquid crystals within the display layer 302, thus generating a pixel. The display drive matrix 304 couples to the display controller 206.

While active, the display drive matrix 404 generates EM fields 406 shown by broken lines in this illustration. The EM fields radiate from the active elements of the display drive matrix 404. As described above, these EM fields 406 may introduce interference into a susceptible component, such as the touch sensor 104.

As described above, the interference suppression module 110 is coupled to both the display controller 206 and the touch sensor 214. When the display controller 206 refreshes at least a portion of the display 102, a status signal is sent to the interference suppression module 110. The interference suppression module 110 is configured to notify the touch sensor controller 214 of the interference. In response, the touch sensor controller 214 modifies input received from the touch sensor 104. As described, this modification may include tagging and handling the input from the touch sensor 104 as suspect or unreliable.

Figure 4:
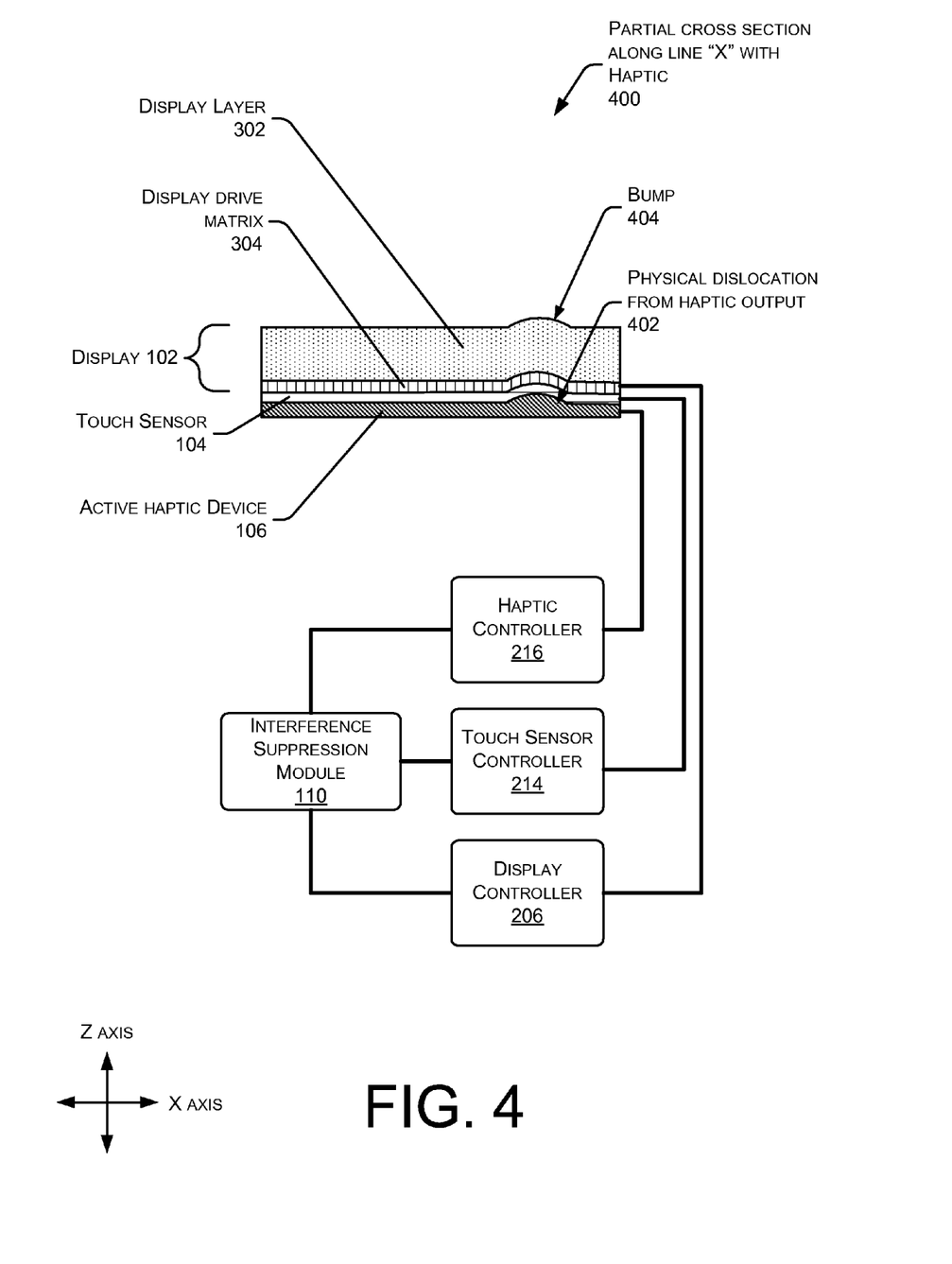
FIG. 4 illustrates a cross section of another implementation of the display, the touch sensor, and the active haptic device.

FIG. 4 illustrates an enlarged cross section 400 of another implementation of the display 102, the touch sensor 104, and the active haptic device 106. In this illustration, the display 102 is disposed proximate to the user during normal use, with the display layer 302 on top and the display drive matrix 304 immediately underneath. As above with regards to FIG. 3, the display drive matrix 304 is coupled to the display controller 206. Beneath the display drive matrix 404 the touch sensor 104 is disposed, coupled to the touch sensor controller 214. The illustrated disposition of the display 102 and touch sensor 104 may be used in situations where a resistive pressure sensor is used, such as an interpolating force sensitive resistor array.

In the implementation shown, the EM fields 306 resulting from activation of the display drive matrix 404 (not shown in this illustration) would be more intense due to the proximity of the display drive matrix 304 and the touch sensor 104. As a result, the coordination between the display controller 206 and the touch sensor controller 214 via the interference suppression module 110 as described above with regards to FIG. 3 would continue.

FIG. 4 further illustrates the active haptic device 106 disposed beneath the touch sensor 104. The active haptic device 106 is coupled to a haptic controller 216. The active haptic device 106 may be configured to generate a physical movement, displacement, or other physical manifestation of at least a portion of the device in which the device resides. As shown here, a portion of the active haptic device 106 has generated a physical displacement 402. This displacement has in turn displaced the touch sensor 104, display drive matrix 304, and the display layer 302, resulting in a bump 404 on the portion of the display 102 proximate to the user. Other layers such as a protective sheet may be disposed between the display layer 402 and the user, but are omitted in this illustration for clarity In situations where the touch sensor 104 is pressure sensitive, the physical dislocation from the haptic output 402 could result in an erroneous touch signal. In other words, the touch sensor controller 214 may interpret the "push" from the active haptic device 106 on the touch sensor 104 as a "push" from the user. Furthermore, operation of the active haptic device 106 may generate EM interference, which may create interference in the touch sensor 104 and in some configurations within the display 102.

To ameliorate the interference, both physical and EM, the interference suppression module 110 couples to the haptic controller 216, the touch sensor controller 214, and the display controller 206. In addition to the coordination between the display controller 206 and the touch sensor controller 214 discussed above with respect to FIG. 3, activities of the haptic controller 216 are introduced into this coordination. For example, during operation of the active haptic device 106, the interference suppression module 110 provides the touch sensor controller 214 with a status signal indicating the presence, location, and nature of haptic interference. The touch sensor controller 214, in response to this status signal, modifies input received from the touch sensor 104. Where the interference from the active haptic device 106 is localized, the correspondingly affected area of the touch sensor 104 may be selectively modified by the touch sensor controller 214 based on the information in the status signal.

Where the physical characteristics of the overall device are known, the touch sensor controller 214 may be configured to modify input from the touch sensor 104 to compensate for haptic output. This compensation may involve the touch sensor controller 214 using an adaptive threshold where the amount of force required for a touch input is varied at least partly in response to the interference generated by the active haptic device 106. For example, where it has been determined that the physical dislocation from haptic output 402 results in 0.25 newtons of force corresponding to a particular location on the touch sensor 104, the touch sensor controller 214 may be configured to disregard the 0.25 newtons of force at that particular location, but accept as touch input of 0.5 newtons force at that particular location as a 0.25 newton touch.

The cross sections shown in FIGS. 3 and 4 are presented for illustration and not by way of limitation. Other implementations and arrangements of components are possible. For example, in some implementations the active haptic device 106 may be disposed elsewhere within the device 100, rather than as a layer under the display. In another example, the force sensitive touch sensor 104 may be disposed atop the display layer 402, and thus is proximate to the user during use.

Figure 5:
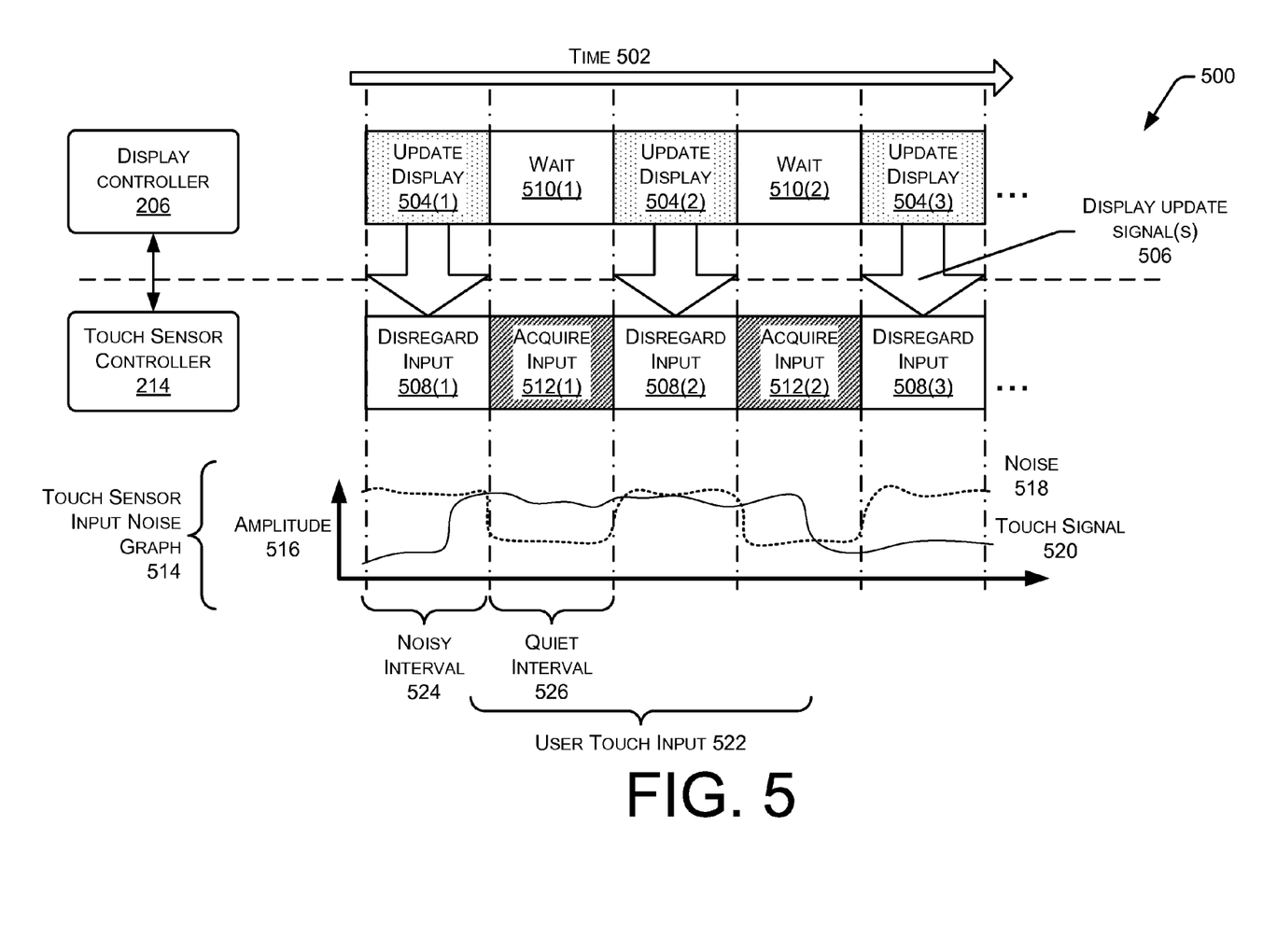
FIG. 5 illustrates a graph of the display and touch sensor operating in coordination with one another to reduce interference in the touch sensor.

FIG. 5 illustrates a graph 500 of the display controller 206 and the touch sensor controller 214 in coordination with one another via the interference suppression module 110 to reduce interference in the touch sensor 104. For the purposes of this graph 500, time increases left to right as indicated by arrow 502. The display controller 206 and touch sensor controller 214 are shown, and the interference suppression module 110 is omitted for clarity. In some implementations the controllers may couple directly to one another, such as via a bus, and portions of the interference suppression module 110 incorporated into the controllers.

As shown, the display controller 206 has initiated a display update 504(1). A display update signal 506(1), such as generated by the interference suppression module 110 in response to the display controller 206 is shown provided to the touch sensor controller 214. The display update signals 506 may be provided directly between the controllers, or via the interference suppression module 110.

The touch sensor controller 214 receives the display update signal 506(1), and proceeds to disregard input 508(1) from the touch sensor 104. As described above, the touch sensor controller 214 may tag input and process the input based on those tags. For example, as shown here the display 102 is actively updating, resulting in generation of the EM fields 406 which may interfere with the touch sensor 104. Because of the interference, the input is tagged as unreliable and is disregarded.

When the display update 504(1) is complete, the display update signal 506(1) may terminate, or the interference suppression module 110 may generate a display update signal 506 indicating the display update is complete. Due to the inactivity of the display 102, the display controller 206 enters a wait 610(1), indicating that the interfering EM fields 306 are no longer present, and the touch sensor controller 214 acquires input 612(1).

Upon being called to update the display 102 again, the display controller 206 initiates a display update 504(2), and the interference suppression module 110 generates a display update signal 506(2) which is received by the touch sensor controller 214. As above, the touch sensor controller 214 is configured to disregard input 508(1) because interference is being generated. This process of coordinating display updates with touch sensor data acquisition thus significantly reduces or eliminates interference that is encountered during uncoordinated operations.

This reduction in interference is shown in the touch sensor input noise graph 514 also shown in this illustration. In this graph, an amplitude of noise 516 is shown in the "Y" axis, while time continues to be shown along the "X" axis. In this graph, a noise signal 518 is shown with a broken line while a touch signal 520 is shown with a solid line. This touch signal may incorporate a user touch input 522. As shown here, during a noisy interval 524 when the update display 504 is in progress, the noise 518 is quite high. Upon entry into a quiet interval 526 where the display controller is waiting 510, the noise level drops substantially. As a result, a signal to noise ratio for the touch signal 520 is greatly improved.

Duration of the update of the display 504 is substantially consistent from one refresh to another. However, the duration of updates of the display 504 may differ from duration of wait periods. For example, the display 102 may have a refresh rate of 30 Hertz, resulting in an update display interval of about 33 milliseconds. Thus, about every 33 milliseconds the update display 504 takes place. However, the update display 504 may only take 10 milliseconds to complete. Thus the wait time 510 is 23 milliseconds. Other implementations may use other ratios of update intervals to wait intervals.

In some implementations, a sampling rate of the touch sensor 104 or another susceptible component may be dynamically varied according to the actual or expected interference. For example, during the noisy intervals 524, the sampling rate may be increased and during the quiet intervals 526 the sampling rate may be decreased.

Figure 6:
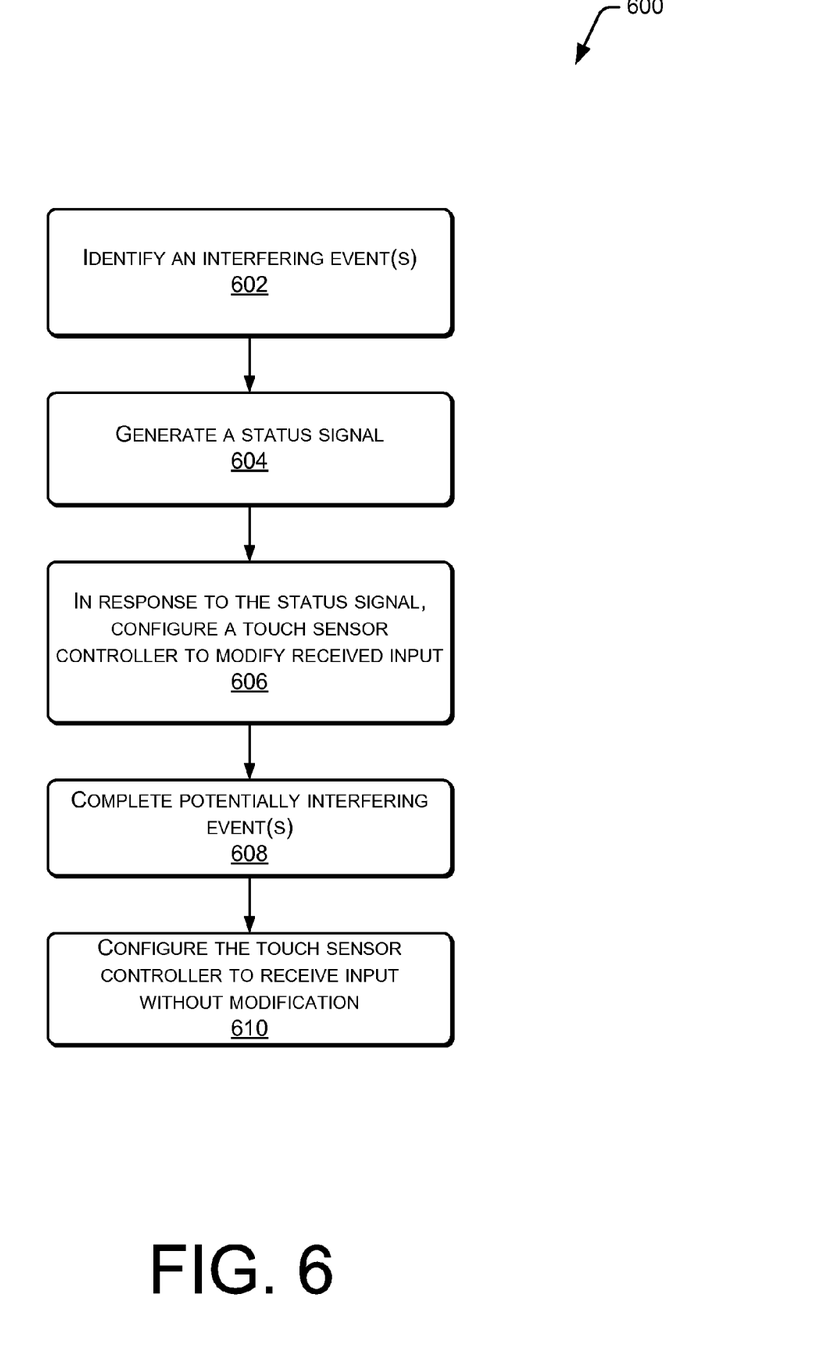
FIG. 6 is an illustrative process of reducing interference experienced by the touch sensor and caused by the refreshing of the display.

FIG. 6 is an illustrative process 600 of reducing interference experienced by the touch sensor and caused by the refreshing of the display The process 600 (as well as the processes described below with respect to FIGS. 8-10) is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 600 (as well as processes 800, 900, and 1000) is described with reference to the architectures of FIGS. 1-4.

At 602, the interference suppression module 110 identifies one or more interfering events or potentially interfering events. Identification may comprise receiving a signal from an interference generating component, or polling the interference generating components to determine state. The interfering events may include an update of the display 102, haptic output, attachment of the power supply 108, and so forth. Interfering events are those which either generate interference, or are likely to generate interference in a susceptible component.

At 604, the interference suppression module 110 generates a status signal in response to the identification of the interfering event. The status signal may be continuous during the interfering event, or intermittent such as indicating the beginning and the end of the interfering event.

At 606, at least partly in response to the status signal from the interference suppression module 110, the touch sensor controller 214 or other component susceptible to interference is configured to modify input received. As described above, this modification may include tagging the input and altering the use or characteristics of the input. For example, the touch sensor controller 206 may be configured to tag as unreliable input received while the status signal indicates an interfering event is taking place, and may accordingly discard the unreliable input. In some implementations, the presence of the status signal may be sufficient to result in the disregarding of touch sensor input or placement of the touch sensor 104 and/or the touch sensor controller 214 into a low power mode without the need for tagging.

At 608, the interfering event completes, such as when a screen refresh or a haptic output completes. The status signal may be discontinued, or an additional status signal indicating completion of the interfering event may be generated. Because the interfering component is inactive, the susceptible component such as the touch sensor is now able to generate output free from the interference.

At 610, the interference now being absent, the touch sensor controller 214 is configured to receive input without modification. For example, the touch sensor controller 214 may tag input as "reliable" and use the reliable input with little or no filtering. In some implementations where some interference continues, such as an ongoing haptic output, the touch sensor controller 214 may tag input as "suspect" and apply additional filtering, weighting, or other operations to the input, adjust scan rate, and so forth. For example, input tagged as "suspect" may be weighted to have less authority than "reliable" data.

Figure 7:
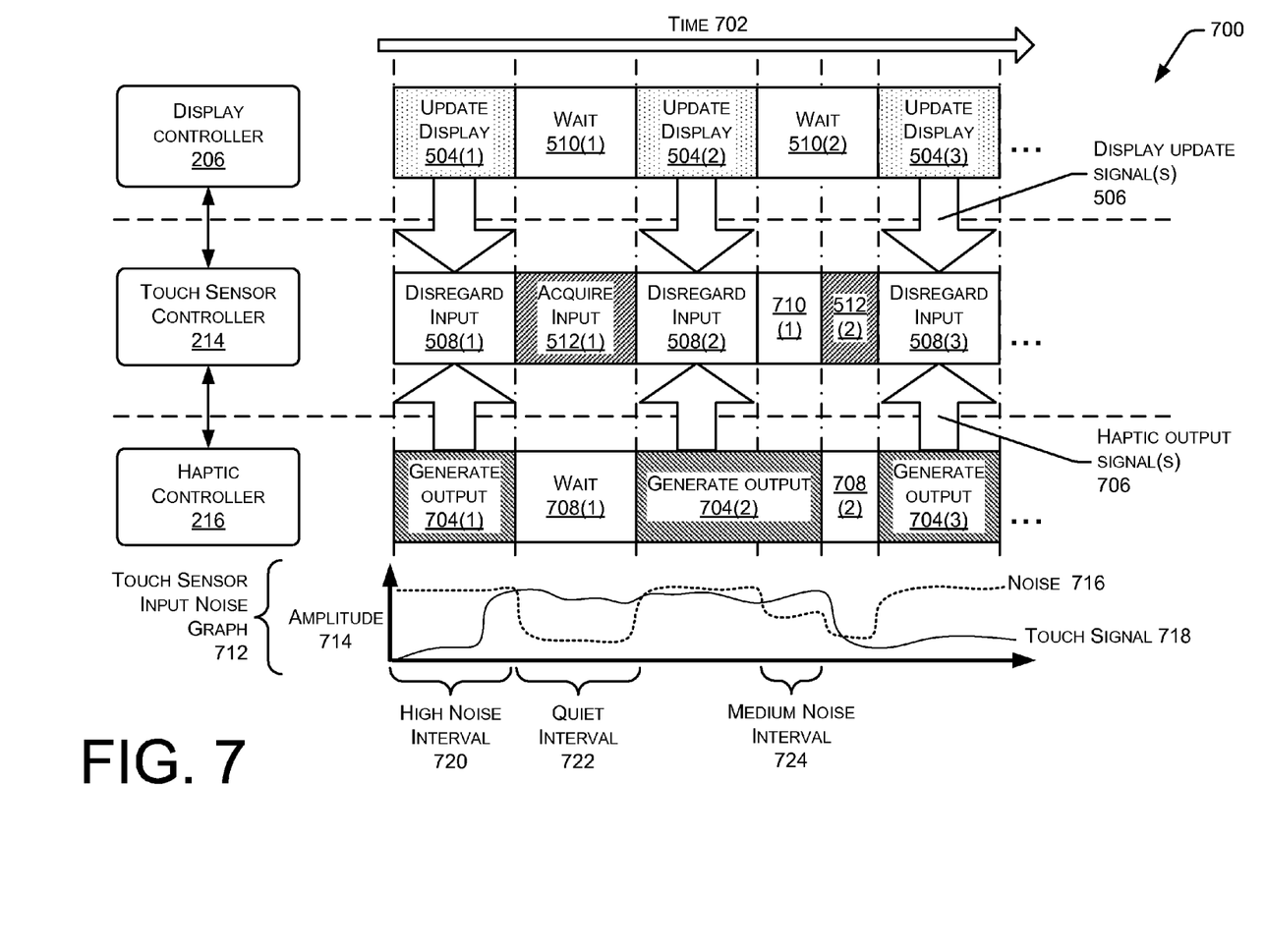
FIG. 7 illustrates a graph of the display, the touch sensor, and the active haptic device operating in synchronization with one another to reduce interference in the touch sensor.

FIG. 7 illustrates a graph 700 of the display, the touch sensor, and the active haptic device in coordination with one another to reduce interference in the touch sensor 104. For the purposes of this graph 700, time increases left to right as indicated by arrow 702. The display controller 206 and touch sensor controller 214 are shown, and the interference suppression module 110 is omitted for clarity. In some implementations the controllers may be couple directly to one another, or may couple via the interference suppression module 110. The touch sensor controller 214 may modify the input from the touch sensor at least in part according to the state of the interfering components as received from the interference suppression module 110. For example, as described above with regards to FIG. 5, while the display controller 206 updates the display 504, the touch sensor controller 214 is configured to disregard input 508, due to interference generated by the display 102.

As described above, the active haptic device 106 may also be present and generating interference. At 704(1) the haptic controller activates the active haptic device 106, generating interference. The interference suppression module 110 sends a haptic output signal 706(1) to the touch sensor controller 214. In response, the touch sensor controller 214 is configured to modify the output from the touch sensor 104. In the example presented here at 508(1), the input is already being disregarded due to the interference from the update of the display 504(1).

At 708(1) the haptic controller 216 has completed the haptic output, and is waiting for the next haptic output event. During this interval, the interference suppression module 110 generates a status signal for the touch sensor controller 214 indicating the interference has ceased. In response, the touch sensor controller 214 is configured to acquire input 512(1). At 704(2) another haptic output is called for by the haptic controller 216, and a haptic output signal 706(2) is ultimately sent to the touch sensor controller 214.

In some implementations the operating duration of interfering components may differ. For example, the update of the display 504(2) may complete in 10 milliseconds while the generating of the output 704(2) may take 20 milliseconds.

At 710(1) the touch sensor controller 214 may be configured by the interference suppression module 110 to tag input from the touch sensor 104 as "suspect" and modify the input. This modification may include assigning less weight to that input, performing extra filtering, and so forth. As described above, in some implementations the characteristic response of the device and the noise produced by the active haptic device may allow for correction and mitigation of interference in the touch sensor 106 from the haptic event. As a result, at 710(1) the touch sensor controller 214 may be configured to tag input from the touch sensor 104 as "suspect" and assign less weight to that input, perform extra filtering, and so forth.

Furthermore, unlike the update of the display 504, haptic outputs may not be generated on a periodic basis. For example, a user may be reading text of an electronic book on the display 102, and no haptic output is called for while the display 102 periodically refreshes. As a result, while the interference generating operations may be coordinated to occur at substantially the same time, they might not occur in the same synchronized intervals.

Coordinating the operation of components in this manner reducing the effects of interference. The reduction in interference is shown in the touch sensor input noise graph 712 also shown in this illustration. In this graph, an amplitude of noise 714 is shown in the "Y" axis, while time continues to be shown along the "X" axis. A noise signal 716 is shown with a broken line while a touch signal 718 is shown with a solid line. The touch 718 signal may incorporate a user touch input. As shown, a high noise interval 720 when the update display 504 is in progress as well as the haptic controller is generating output 704(1). When the display controller 206 and the haptic controller 216 are waiting, a quiet interval 722 exists. As shown, during this quiet interval 722 the noise level drops substantially, and a signal to noise ratio for the touch signal 718 is greatly improved.

Depending upon the combination of interfering components which are active, the noise 716 may vary. For example, when the haptic controller 216 is actively generating output 704(2) and the display controller 206 is waiting 510(2), a medium noise interval 724 is shown. As described above, the touch sensor controller 214 tags input acquired during the medium noise interval 724 as suspect and perform additional filtering, change sampling rates, and so forth.

While the graph displays input being disregarded during the update display 704 events, and modified during generating output 704 from the active haptic device 106, the opposite situation may take place. For example, interference generated by the display 102 may be equal to or lesser than that of the interference generated by the haptic output. As a result, input may be modified according to the expected or actual noise exceeding one or more pre-determined noise thresholds. Thus, the touch sensor controller 214 may modify input when an interference generating component is active, but discard input when two or more interference generating components are active.

Figure 8:
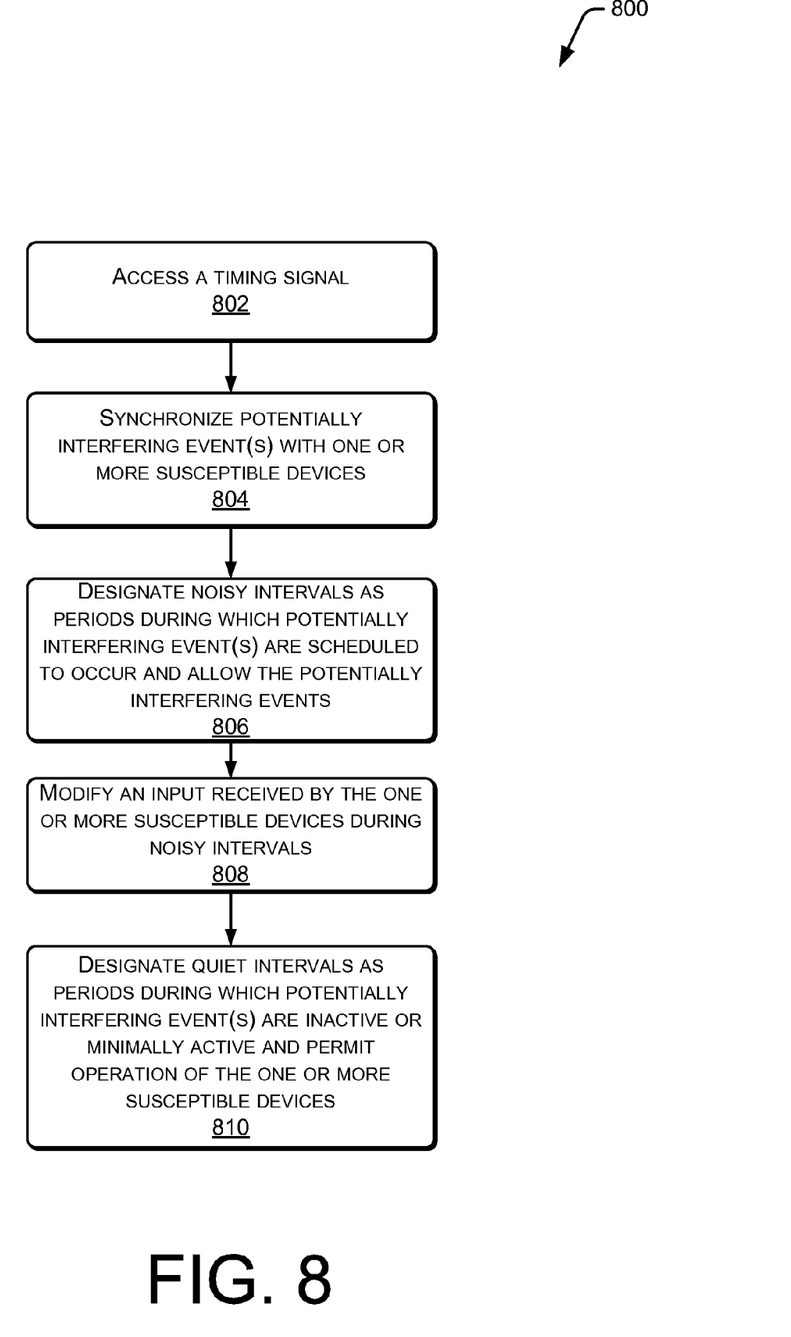
FIG. 8 is an illustrative process of reducing interference experienced by the touch sensor via timing synchronization.

FIG. 8 is an illustrative process 800 of interference reduction via timing synchronization. In components where interference occurs on a recurring predicable basis, such as interference to the touch sensor 104 resulting from the regular refresh of the display 102, the interference suppression module 110 may utilize a timing signal rather than discrete notifications from each potentially interfering component to coordinate the operation of interfering and susceptible components.

At 802, the interference suppression module 110 accesses a periodic timing signal, such as bus clock, display controller clock, and so forth. At 804, predictable actual or potentially interfering output events are synchronized with one or more susceptible components. For example, the refresh of the display 102 by the display controller 204 is synchronized with the touch sensor controller 214.

At 806, noisy intervals are designated as periods during which actually or potentially interfering events are scheduled to take place. For example, the noisy intervals may comprise the times during which the regular refresh of the display 102 takes place.

At 808, input received by the one or more susceptible components during the noisy intervals is modified. As described above this may involve tagging and adjusting the input received at least in part based upon those tags. Modification may include discarding input tagged as unreliable, or weighting, filtering, or otherwise processing input tagged as suspect.

At 810, quiet intervals are designated as periods during which actually or potentially interfering events are inactive or minimally active. During the quiet intervals, operation of the one or more susceptible components is scheduled. For example, the quiet interval may extend for 20 milliseconds following a screen refresh, an input from the touch sensor 104 received by the touch sensor controller 214 is tagged as "reliable."

Use of the timing signals to coordinate activities operates well when deterministic behavior on the part of interfering and susceptible components is possible. For example, the regular schedule of refreshes to the display and the generally constant time required for the refresh to complete allows for determination of regular interference free periods during which susceptible components may operate without interference.

Figure 9:
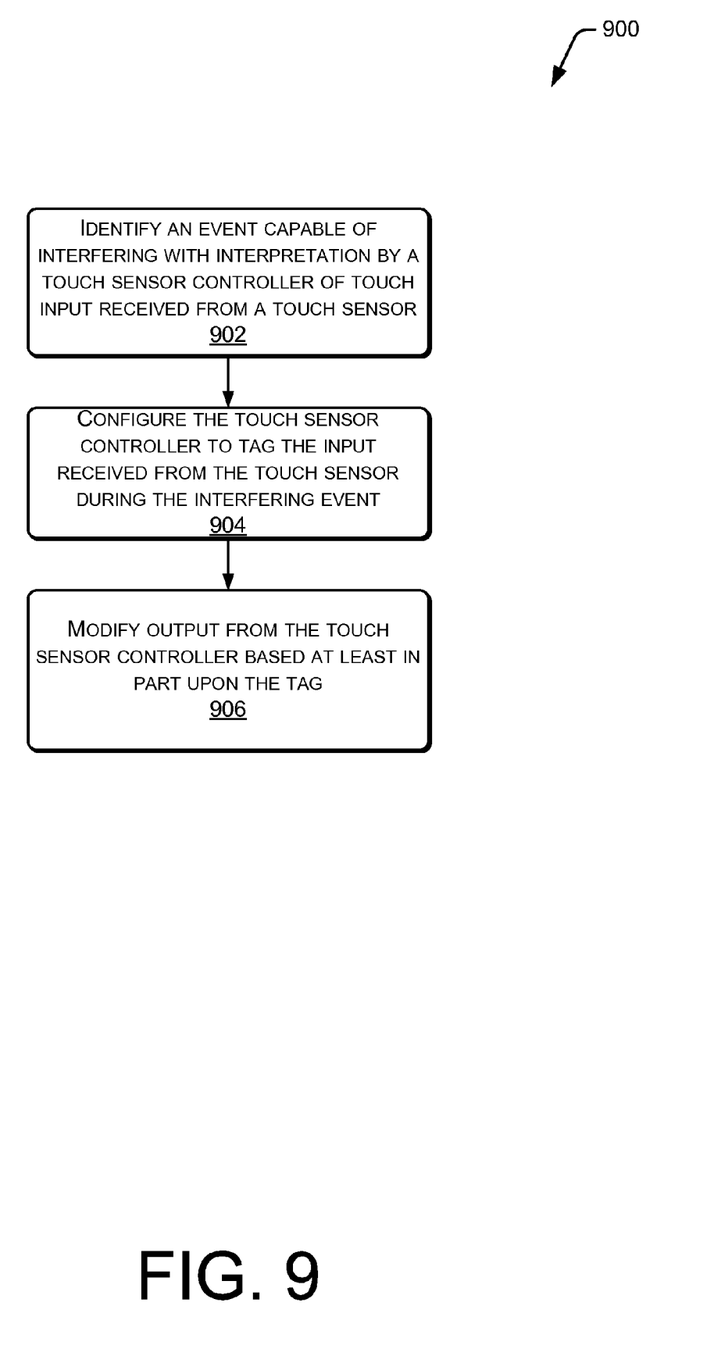
FIG. 9 is an illustrative process of reducing interference experienced by the touch sensor via tags.

FIG. 9 is an illustrative process 900 of reducing interference experienced by the touch sensor 104 via tags. As described above, tags may be used to categorize and process touch input generated by the touch sensor 104.

At 902, the interference suppression module 110 identifies an event capable of interfering with interpretation by the touch sensor controller 214 of touch input received from the touch sensor 104. For example, the event may comprise an active display update, a haptic output, a battery charge event, or a combination thereof.

An event capable of interfering reduces the signal-to-noise ratio of an output signal generated by the touch sensor 104 and received by the touch sensor controller 214 as input. As a result, the signal of an actual touch is buried within noise resulting from the interference.

The interference suppression module 110 may identify the event as an event capable of interfering by receiving a status signal from a potentially interfering device that initiates the event. For example, the display controller 206 may send a status signal indicating a display update will take place, which would then generate interference.

In some implementations, the event is present at or affects a portion of the touch sensor 104 that is less than the entire touch sensor 104. For example, the wireless module 218 may have the antenna 222 adjacent to a top-left quadrant of the display. When active, the wireless module 218 may introduce interference in the portion of the touch sensor 104 proximate to the antenna 222. In this situation, the touch sensor controller 214 is configured to modify output associated with that portion of the touch sensor 104 while refraining from modifying output associated with a remaining portion of the touch sensor 104 which is not experiencing the interference.

At 904, the interference suppression module 110 configures the touch sensor controller 214 to tag the input received from the touch sensor 104 during the interfering event. For example, the tags may designate the input to the touch sensor controller 214 as reliable, suspect, or unreliable.

At 906, output from the touch sensor controller 214 is modified based at least in part upon the tag. For example, data tagged as suspect may be processed by the touch controller 214 and assigned a lower weight to input from the touch sensor 104 received during the event. Alternatively, the touch controller 214 may modify the input by entirely disregarding data tagged as unreliable.

Figure 10:
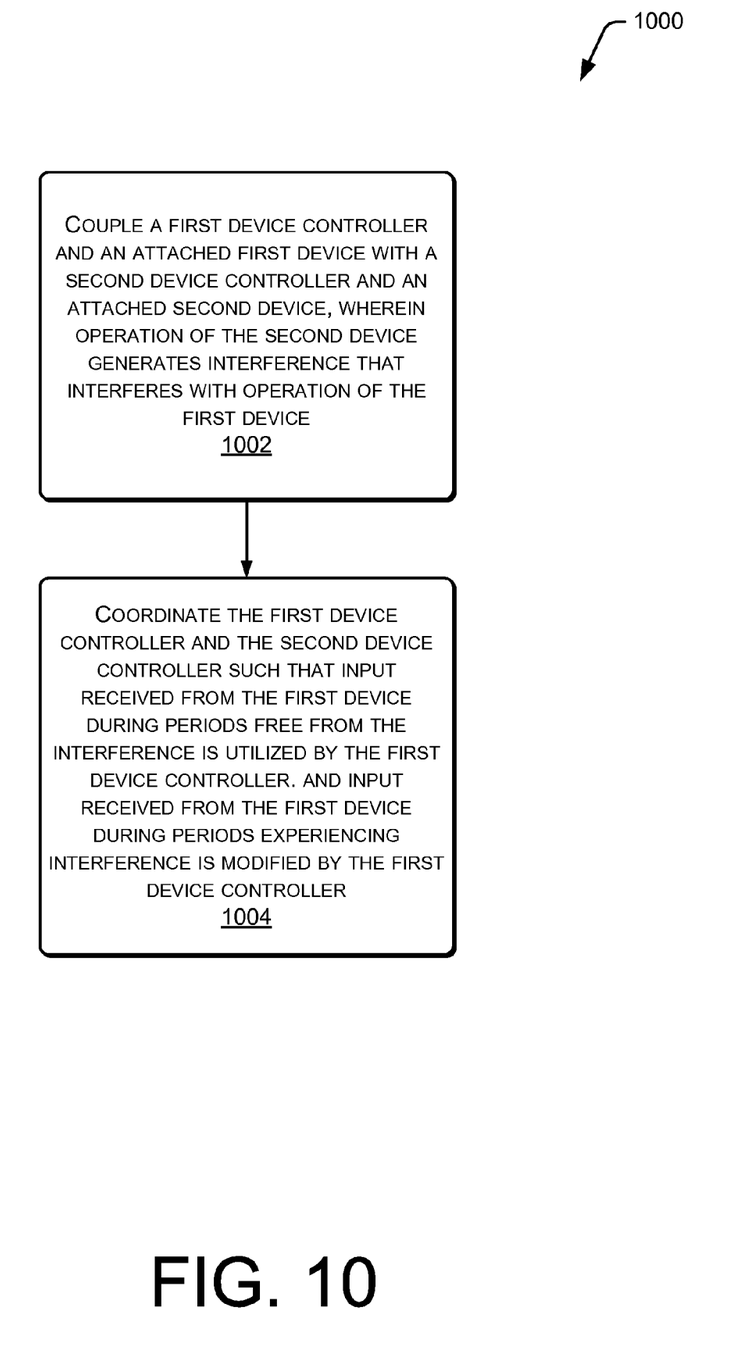
FIG. 10 is an illustrative process of reducing interference experienced between devices by coordinating the operation of these devices.

FIG. 10 is an illustrative process 1000 of reducing interference experienced between components by coordinating operation of these components. Various components may interfere with one another during operation. For example, the wireless module 218 may interfere with operation of the touch sensor 104 while operation of the active haptic device 106 may interfere with the wireless module 218, and so forth. Interference between components may thus be reduced by performing interfering operations at times when the susceptible components are not operating, or modifying the output of the susceptible components while the known interference is occurring.

At 1002, a first device controller and an attached first device couple with a second device controller and an attached second device. Operation of the second device is such that interference is generated that interferes with operation of the first device.

The interference comprises a reduction in a signal-to-noise ratio of signals generated by the first device. As a result, the signals generated by the first device may be buried within the noise, and require additional filtering or processing to recover, if recovery of the signal is even possible. In another example, the interference comprises an increase in a noise floor measured at an input of the first controller coupled to an output of the first device.

At 1004, an interference suppression module 110 coordinates the first device controller and the second device controller. This coordination allows input received from the first device during periods free from the interference to be utilized by the first device controller while the first device controller modifies input received from the first device during periods experiencing interference.

In one implementation, the first device controller may comprise the touch sensor controller 214 and the first device may comprise the touch sensor 104. The second device controller may comprise the display controller 206 and the second device may comprise the active display 102. In some implementations, the second device controller may comprise the haptic controller 216 and the second device comprises the active haptic device 106.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
 identifying an event capable of interfering with interpretation by a touch sensor controller;
 receiving first input from a touch sensor during the event;
 configuring the touch sensor controller to tag the first input using a first tag;
 modifying output from the touch sensor controller based, at least in part, on the first tag;
 identifying an end of the event;
 receiving second input from the touch sensor; and
 configuring the touch sensor controller to tag the second input using a second tag.

2. The method of claim 1, wherein the identifying of the event comprises identifying an active display update, a haptic output, a battery charge event, or a combination thereof.

3. The method of claim 1, wherein the identifying of the event comprises identifying an event that reduces the signal-to-noise ratio of an output signal generated by the touch sensor and received by the touch sensor controller as input.

4. The method of claim 1, wherein the modifying the output comprises disregarding the first input.

5. The method of claim 1, wherein the modifying the output comprises assigning a lower weight to the first input.

6. The method of claim 1, wherein the identifying the event comprises receiving a status signal from a potentially interfering device that produces the event.

7. The method of claim 1, wherein the event is present at a first portion of the touch sensor, and the touch sensor controller is configured to modify output associated with the first portion of the touch sensor while refraining from modifying output associated with a second portion of the touch sensor.

8. The method of claim 1, wherein:
the modifying the output comprises disregarding the first input based, at least in part, on the first tag; and
the method further comprising utilizing the second input based, at least in part, on the second tag.

9. The method of claim 1, wherein the configuring the touch sensor controller to tag the first input using the first tag comprises:
configuring the touch sensor controller to tag the first input using a first input tag based, at least in part, on a first component causing the event; and
configuring the touch sensor to tag the first input using a second input tag based, at least in part, on a second component causing the event.

10. A device comprising:
a touch sensor;
one or more processors; and
one or more computer-readable media storing instructions that, when executed by the one or more processors, cause the one or more processors to perform acts comprising:
identifying an event capable of interfering with interpretation by a touch sensor controller;
receiving input from the touch sensor during the event;
configuring the touch sensor controller to tag the input using a first tag based, at least in part, on the event creating a first level of interference;
configuring the touch sensor controller to tag the input using a second tag based, at least in part, on the event creating a second level of interference; and
modifying output from the touch sensor controller based, at least in part, on the first tag or the second tag.

11. The device of claim 10, wherein the event comprises an active display update, a haptic output, a battery charge event, or a combination thereof.

12. The device of claim 10, wherein the modifying the output comprises disregarding the input.

13. The device of claim 10, wherein the modifying the output comprises assigning a lower weight to the input.

14. The device of claim 10, wherein the identifying the event comprises receiving a status signal from a potentially interfering device that produces the event.

15. A non-transitory computer-readable storage media storing instructions that, when executed, instruct a processor to perform acts comprising:
identifying an event capable of interfering with interpretation by a touch sensor controller;
receiving first input from a touch sensor during the event;
configuring the touch sensor controller to tag the first input using a first tag;
modifying output from the touch sensor controller based, at least in part, on the first tag;
identifying an end of the event;
receiving second input from the touch sensor; and
configuring the touch sensor controller to tag the second input using a second tag.

16. The non-transitory computer-readable storage media of claim 15, wherein the event comprises an active display update, a haptic output, a battery charge event, or a combination thereof.

17. The non-transitory computer-readable storage media of claim 15, wherein the event reduces the signal-to-noise ratio of an output signal generated by the touch sensor and received by the touch sensor controller as input.

18. The non-transitory computer-readable storage media of claim 15, wherein the modifying the output comprises disregarding the first input.

19. The non-transitory computer-readable storage media of claim 15, wherein the modifying the output comprises assigning a lower weight to the first input.

20. The non-transitory computer-readable storage media of claim 15, wherein the identifying the event comprises receiving a status signal from a potentially interfering device that produces the event.

* * * * *